United States Patent

[11] 3,621,896

| [72] | Inventor | Lewis J. Hamilton<br>20006 Aqua Drive, Sumner, Wash. 98390 |
|---|---|---|
| [21] | Appl. No. | 869,686 |
| [22] | Filed | Oct. 27, 1969 |
| [45] | Patented | Nov. 23, 1971 |

[54] LUBRICATED CHAIN SAW SUPPORT
5 Claims, 4 Drawing Figs.

[52] U.S. Cl. .................................................. 143/32 A
[51] Int. Cl. ........................................................ B27b 17/12
[50] Field of Search ........................................... 184/15, 15
A, 15 B, 14; 143/32, 32.1, 32.10

[56] References Cited
UNITED STATES PATENTS

| 3,044,506 | 7/1962 | Oehrli ........................ | 184/15 X |
| 3,279,508 | 10/1966 | Ehlen et al. ................. | 143/32 |

FOREIGN PATENTS

| 948,600 | 2/1964 | Great Britain ............... | 143/32 |

*Primary Examiner*—Manuel A. Antonakas
*Attorney*—Kolisch & Hartwell

ABSTRACT: A chain saw bar with a roller for guiding chain over the tip of the bar journaled at the tip end thereof. The bar is laminated and includes a core lamina sandwiched between face laminae, the core lamina being formed to provide a channel extending along the length of the bar for lubricant supplied under pressure. A bearing plate in which the roller is journaled has a portion sandwiched between the face laminae of the bar and a projecting portion which extends beyond the face laminae which journals a hub in the roller. The channel for lubricant in the bar communicates with a passage in the bearing plate, which passage has a discharge end for discharging lubricant on a side of the bearing plate where portions of the roller move over the discharge end.

PATENTED NOV 23 1971

3,621,896

Lewis J. Hamilton
INVENTOR
BY Kolisch & Hartwell
Attys.

LUBRICATED CHAIN SAW SUPPORT

This invention relates to chain saws, and more particularly, to a support for the moving saw chain in a chain saw. The support includes a chain saw bar, and means for lubricating the top end of the bar with lubricant that flows through the bar and is supplied under pressure at the opposite end of the saw bar.

In the usual chain saw which includes a saw chain moving about a so-called chain saw bar, difficulties have been noted in providing for relatively frictionless movement of the saw chain as it moves about the tip of the bar. These difficulties include the fact that adjacent the tip end of a bar, the saw chain changes its direction of travel, with wear, as a result, tending to be produced. In recent years, there has been a tendency to move the chain at ever faster speeds during cutting, which has contributed to the problem. To reduce friction and wear at the saw bar tip, some have proposed including a roller at the tip for carrying the saw chain about the tip, but if such is done the roller must be properly lubricated if it is to perform as desired.

In general terms, this invention contemplates improvements in the means for lubricating a saw chain during its travel about the structure which supports it in a chain saw.

More particularly, this invention concerns an improved construction for the support for a saw chain where a channel is provided extending along the length of the support for carrying liquid lubricant introduced into the channel under pressure.

In a specific and preferred embodiment of the invention, the chain saw support includes a saw bar and a roller journaled at the tip thereof. The channel for feeding lubricant to the end of the support discharges lubricant against such roller whence it is carried by movement of the roller to regions requiring lubrication.

It has been found following the invention that lubricant discharged adjacent the roller and carried by the roller on roller movement produces a desirable cleansing action freeing regions of the tip from sawdust and other collected residue, whereby the saw chain moves more freely in its path about the tip of the saw.

Various other objects and advantages will become more fully apparent as the following description is read in conjunction with the accompanying drawings, wherein.

Figure 1:
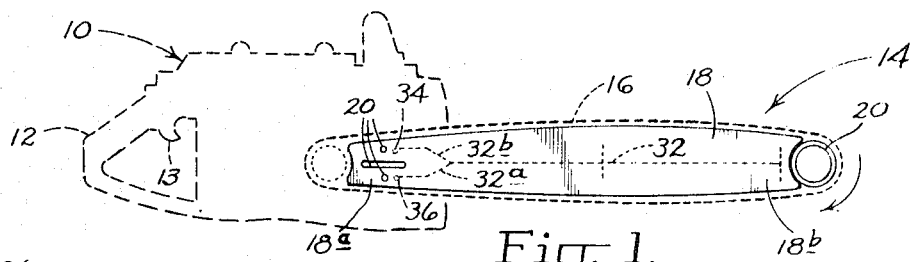
FIG. 1 is a view illustrating a chain saw, including motor unit for powering the chain saw indicated in dashed outline, and equipped with a saw chain support as contemplated by the invention for carrying the saw chain.

Referring now to the drawings, and first of all more particularly to FIG. 1, the chain saw illustrated comprises the usual motor unit shown at 10 which includes the motor which powers the saw chain in its movement. The unit includes the usual handle 12 for manipulating it, and trigger control 13 for controlling the running of the motor. Fastened to the motor unit housing, and projecting forwardly therefrom, is an elongated support 14 which the saw chain, indicated by the dashed line 16, travels about during the operation of the chain saw.

The support 14 includes what is commonly referred to as a saw bar 18, with an end 18a, a referred to as a mounted end which is secured by fasteners utilizing openings 20 to the motor unit, and an opposite end referred to as a tip end 18b. A roller, designated generally at 20 is mounted at the tip end of the bar, and this roller carries the saw chain on its travel around the tip end. In the usual chain saw, saw chain 16 is moved so that its lower run in FIG. 1 travels toward the motor unit, the upper run of the chain moving to the right or away from the motor unit, and the roller then rotating in a clockwise direction.

Figure 2:
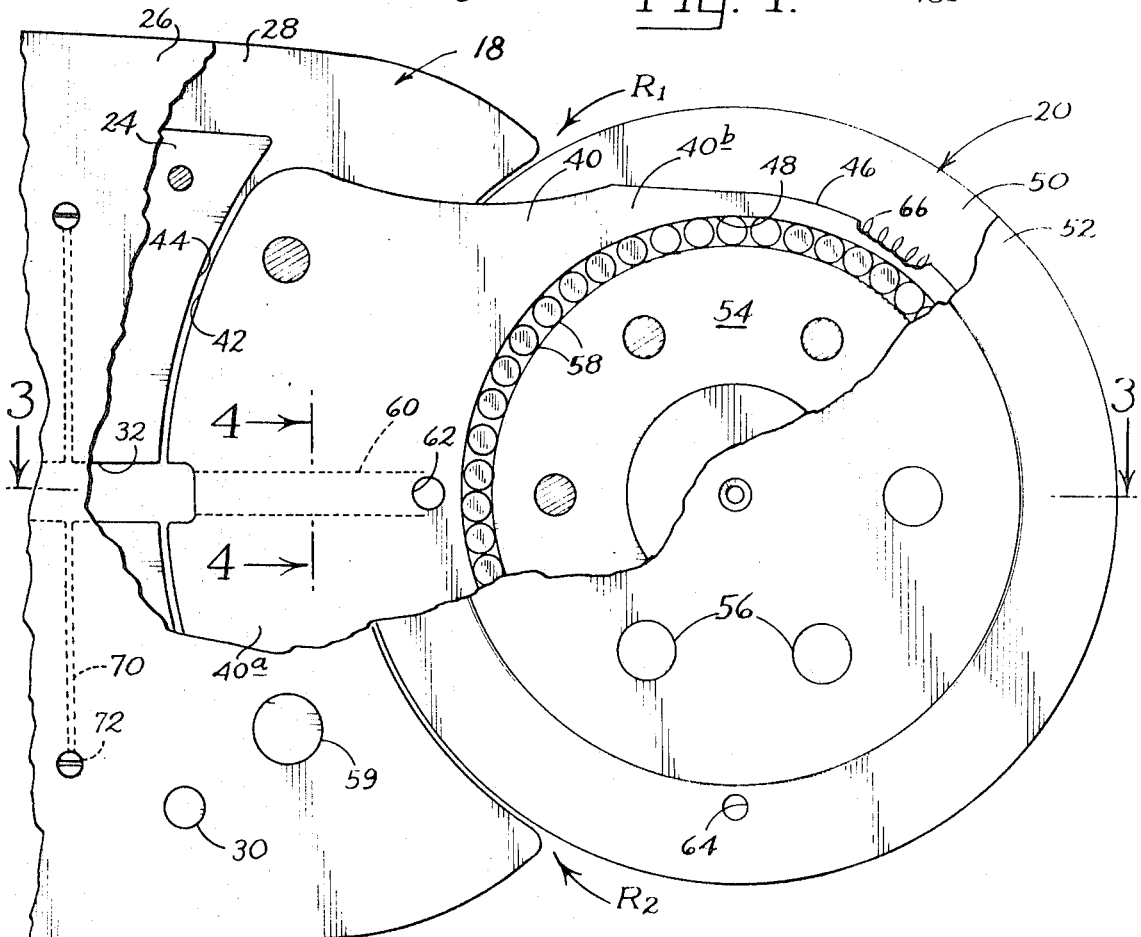
FIG. 2 is a view on a somewhat larger scale, and with portions broken away, illustrating the tip end of the bar in the support for the chain, and a roller which is provided at such tip end which functions to carry chain around the tip end of the bar.
Figure 3:
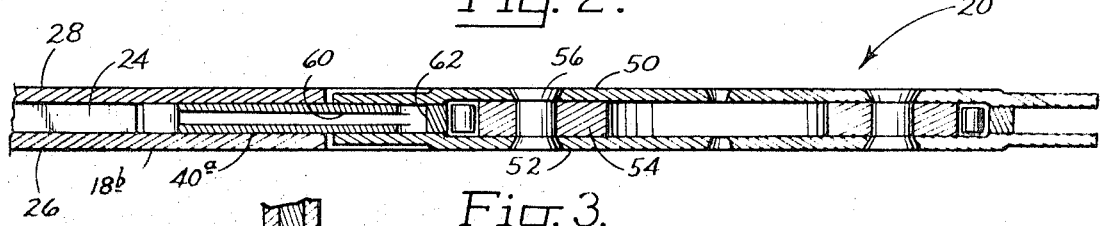
FIG. 3 is a cross-sectional view of the bar tip and roller shown in FIG. 2 taken along the line 3—3 in FIG. 2.

Considering now also FIGS. 2 and 3, bar 18 has a laminated construction, and comprises a core lamina, portions of which are shown in FIG. 2 at 24, sandwiched between opposed face laminae 26, 28. The lamina on the face of the bar ordinarily is made of steel. The core lamina may also be made of metal, although to obtain lightness of weight a material such as aluminum might be selected. The core and face laminae are joined together through multiple rivets provided along the length of the bar, such as those shown at 30 in FIG. 2.

Shown at 32 in FIG. 2 is the end of a channel which is provided in the saw bar extending inside the bar and intermediate the opposite edges thereof. This channel may be formed by forming the core lamina of separate pieces with such spaced apart in the region where the channel is located. With the bar completely assembled, the void region between the core pieces will be bounded on opposite sides by the face laminae of the bar whereby a channel enclosed on all sides is formed.

Referring to FIG. 1, the channel in this figure is indicated by the dashed line 32 and it will be noted that the channel extends substantially the entire length of the bar. Adjacent the mounted end of the bar the channel diverges into two legs shown at 32a and 32b. Bores 34, 36 formed in the bar and extending normal to the plane of the bar communicate with the ends of these diverging legs. These bores constitute inlet openings communicating with channel 32 for the introduction of liquid lubricant under pressure to the channel. With most chain saws, a supply of liquid lubricant is provided on the motor unit, and this supply is connected with one of the bores 34, 36 to enable lubricant to be fed into channel 32. The other bore is plugged, to prevent the escape of lubricant therefrom. Two bores are provided, and the particular bore which is plugged (the particular bore in fluid communication with the lubricant source on the motor unit) depends upon which edge of the bar is used to support the saw chain as it actually passes through the work in a cutting pass. The bar, as is conventional, may be turned over periodically to distribute wear occurring therein.

Considering now in more detail the construction of the roller and its mounting at the tip of bar 18, shown at 40 is what is referred to herein as a bearing plate which includes an inner portion 40a which is sandwiched between the face laminae of the bar. Such terminates in an arcuate edge 42 which lies adjacent an arcuate edge 44 of the core lamina 24. The bearing plate includes a portion 40b which projects beyond the bar. The outer edge 46 of this outer portion has a circular curvature. The outer projecting portion has a circular opening provided therein, defined by circular edge 48.

Roller 20 comprises a pair of opposed, laterally spaced-apart roller plates 50, 52 of generally circular outline as shown in FIG. 2. Between the plates and spacing them apart is a hub member 54. The hub member and roller plates are all secured together to form a unitized structure by rivets 56.

The roller assembled with the roller plates on opposite sides of the projecting portion of bearing plate 40. The hub member is placed within the opening defined by circular edge 48 and bearings 58 are provided in the annular space defined by edge 48 and the periphery of the hub member. In this way, a bearing mounting is provided for the roller at the tip of the bar with the bearings held in place through the bearing plate. The bearing plate is secured to the bar by rivets 59.

Figure 4:
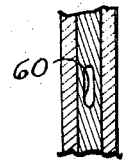
FIG. 4 is a cross-sectional view taken along the line 4—4 in FIG. 3, illustrating details of a passage provided for the carrying of lubricant as contemplated by the invention.

Further considering roller mounting plate 40 and now referring more particularly to FIGS. 2, 3, and 4, extending along the inner portion of the bearing plate to a point directly adjacent circular edge 48, is a passage 60. This passage, which along its length is closed on all sides by portions of the mounting plate, communicates at the left end thereof in FIGS. 2 and 3 with channel 32 previously described, A bore 62 normal to the plane of the roller bearing plate extends through the plate adjacent the right-hand extremity of passage 60 in FIG. 2. The bore communicates with the passage and in this way a discharge opening is provided for the passage on each side of the roller bearing plate. These discharge openings are located radially inwardly of the periphery of roller plates 50, 52, so that oil or lubricant passing out through these passages or openings is discharged onto the inner spaces of plates 50, 52.

Referring to FIG. 2, roller plate 52 has a bore 64 extending through the plate. This bore is spaced radially from the axial center of plate 52 the same distance as the spacing from such center of bore 62. Roller plate 50 is provided with a similar bore registering with bore 64. These bores may be moved into joint registry with bore 62 on rotation of the roller approximately 90° and in a clockwise direction from the position shown in FIG. 2. With the various bores registering, a narrow object may be passed through the bores for the purpose of cleaning bore 62.

The inner face of each roller plate may be roughened as by providing shallow recesses disposed in a row extending about the inner face, as exemplified by the recesses shown at 66. The roughened region passes over bore 62 with the roller rotated, and functions to catch lubricant and distribute it by carrying it generally circumferentially about the axis of the roller.

Additional lubrication on the faces of the chain bar may be introduced by providing side channels 70 in the core lamina of the bar joining with channel 32, which eject oil on the faces of the bar through bores joining with the channels as exemplified by the bore receiving the screw shown at 72. The screw has part of its threaded structure removed, and by loosening the screw slightly, oil leaks past the screw. Adjustment of the screw changes the degree of leakage and thus controls oil flow.

Note that there is also lubrication of the saw bar edges through lubricant flowing through the space provided between edge 42, 44 of the bearing plate and core lamina, respectively.

Describing now generally the way the saw chain support may be utilized with lubrication of operating parts, liquid lubricant is introduced under pressure to channel 32, to the particular bore 34, 36 which is in communication with the lubricant supply on the motor unit. Such lubricant flows along the channel and through passage 60 to be discharged on opposite sides of the roller bearing plate at the location of bore 62. Some of such lubricant, because of the proximity of this bore to the annular channel which holds the bearings, will find its way into such channel to lubricate these bearings. The lubricant also will tend to be smeared over opposite faces of the roller bearing plate by rotation of the roller produced on the chain traveling over the roller, to lubricate the inner faces of the roller plates further to reduce rolling friction between the roller and plate 40. Some oil will be thrown onto the saw chain which travels about the roller, thus to lubricate the saw chain prior to its traveling over the edge of the bar in a cutting direction and through the wood which is being cut.

It has been noted that whereas with some chain saws including rollers, there is a tendency for sawdust and other material to collect on the bar on the noncutting edge and immediately prior to the roller, such does not pose a problem with a bar and roller as contemplated by the instant invention. This is because it has been found that lubricant moved upwardly in FIG. 2 by movement of the roller cleans the region indicated generally at $R_1$. Further, sawdust collecting at region $R_2$ does not cake because of the presence of lubricant.

With the construction of the invention, chain saws may be operated even at relatively fast speeds with considerably less wear in the chain and in the parts of the chain support than experienced with previous constructions. The chain moves more freely and better cutting results are obtained.

While a particular embodiment of the invention has been disclosed, obviously changes and variations are possible without departing from the invention as will be apparent to one skilled in the art.

It is claimed and desired to secure by letters patent:

1. A support for a saw chain comprising an elongated chain saw bar having mounted and tip ends, said bar including a core lamina sandwiched between outer face laminae forming the outer faces of the bar, a bearing plate in the plane of the core lamina fastened to the tip end of the bar and projecting beyond the tip end of the bar, a roller journaled in said bearing plate adapted to carry saw chain about the tip end of the bar, a lubricant channel extending along the length of the bar between the side faces thereof and having an inlet opening for the reception of lubricant adjacent the mounted end of the bar and an outlet opening adjacent the tip end of the bar and said bearing plate, and a fluid passage extending in the plane of said bearing plate joining at one end with said channel and having an opposite end which is a discharge end positioned to discharge lubricant whereby such may lubricate said roller, said roller including a roller plate with a peripheral margin that guides the saw chain and that on rotation of the roller moves over said discharge end of said passage.

2. The support for saw chain of claim 1, wherein the discharge end of said passage opens to at lease one face of the bearing plate and said roller plate is one of a pair of opposed roller plates disposed on either side of said bearing plate.

3. The support for saw chain of claim 2, wherein said roller further includes a hub which is disposed between and spaces apart the roller plates of the roller, said hub is rotatably mounted with the bearing plate to rotate therein, and said fluid passage has a discharge end which opens to the face of the bearing plate adjacent to said hub.

4. The saw chain support of claim 3, wherein said passage where it is formed in said bearing plate is closed around all sides by portions of the bearing plate intermediate the inlet and discharge ends thereof.

5. The support for a saw chain of claim 1 wherein said face laminae at the tip end of the bar extend beyond the core lamina, the bearing plate is bounded by an edge located between said face laminae which substantially parallels and lies adjacent a bounding edge of said core lamina, and said edge of said bearing plate and bounding edge of the core lamina together define a passage connecting with said channel for feeding lubricant to an edge of the bar adjacent its said tip end.

* * * * *